United States Patent
Disney et al.

(10) Patent No.: US 8,541,987 B2
(45) Date of Patent: Sep. 24, 2013

(54) LOW LOSS DISCHARGE CIRCUITS FOR EMI FILTER CAPACITORS

(75) Inventors: Donald R. Disney, Cupertino, CA (US); Michael Hsing, Saratoga, CA (US); James Nguyen, San Jose, CA (US); James Moyer, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 508 days.

(21) Appl. No.: 12/956,351

(22) Filed: Nov. 30, 2010

(65) Prior Publication Data

US 2012/0007567 A1 Jan. 12, 2012

Related U.S. Application Data

(60) Provisional application No. 61/362,217, filed on Jul. 7, 2010.

(51) Int. Cl.
*H02J 7/00* (2006.01)
*H02J 7/04* (2006.01)

(52) U.S. Cl.
USPC .......... 320/166; 320/167; 320/132; 320/134; 320/152

(58) Field of Classification Search
CPC ........................................................ H02J 7/345
USPC ......................................................... 320/166
See application file for complete search history.

(56) References Cited

U.S. PATENT DOCUMENTS

2006/0197695 A1* 9/2006 Takeuchi et al. .............. 341/155
2011/0068751 A1* 3/2011 Lin et al. ....................... 320/166

* cited by examiner

*Primary Examiner* — Edward Tso
*Assistant Examiner* — Ahmed Omar
(74) *Attorney, Agent, or Firm* — Okamoto & Benedicto LLP (57) ABSTRACT

A discharge circuit for an EMI filter capacitor includes normally-ON transistors. The normally-ON transistors may be controlled to limit current through them when an AC source is coupled across the discharge circuit. When the AC source is disconnected from the discharge circuit, the normally-ON transistors turn ON to allow current flow through them. The current flow allows the EMI filter capacitor to be discharged by a discharge resistor.

20 Claims, 6 Drawing Sheets

LOW LOSS DISCHARGE CIRCUITS FOR EMI FILTER CAPACITORS

CROSS-REFERENCE TO RELATED APPLICATION

This application claims the benefit of U.S. Provisional Application No. 61/362,217, filed on Jul. 7, 2010.

BACKGROUND OF THE INVENTION

1. Field of the Invention

The present invention relates generally to electrical circuits, and more particularly but not exclusively to discharge circuits for EMI filter capacitors.

2. Description of the Background Art

In some alternating current (AC) to direct current (DC) power supply applications, a relatively large capacitor is coupled across the AC input to serve as a noise filter for reducing the effect of electromagnetic interference (EMI) that may be generated by the AC-DC power supply. This capacitor, referred to as an "EMI filter capacitor," is charged to high voltage by the AC signal and thus may pose a safety risk if the AC plug is disconnected from the wall socket and touched by a person. To minimize the safety risk, a resistor is typically placed in parallel with the EMI filter capacitor, such that the resistor can discharge the capacitor in a fairly short time (e.g. reduce the voltage by more than 60% in less than 1 second). This parallel resistor has the disadvantage of causing a constant power loss when the AC source is connected.

Figure 1:
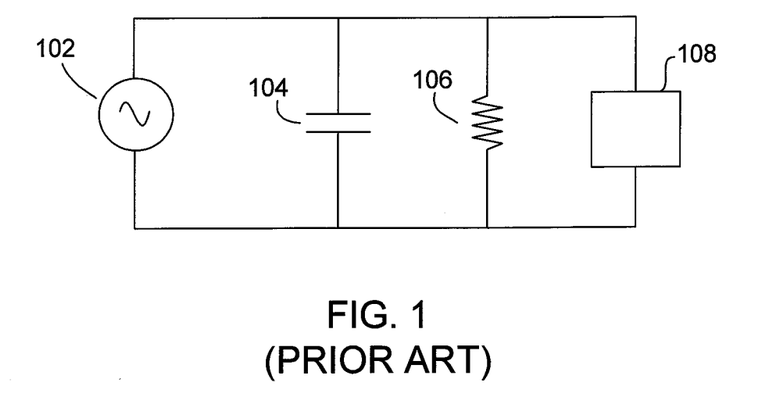
FIG. 1 shows a schematic diagram of a conventional EMI filter circuit.
Figure 2:
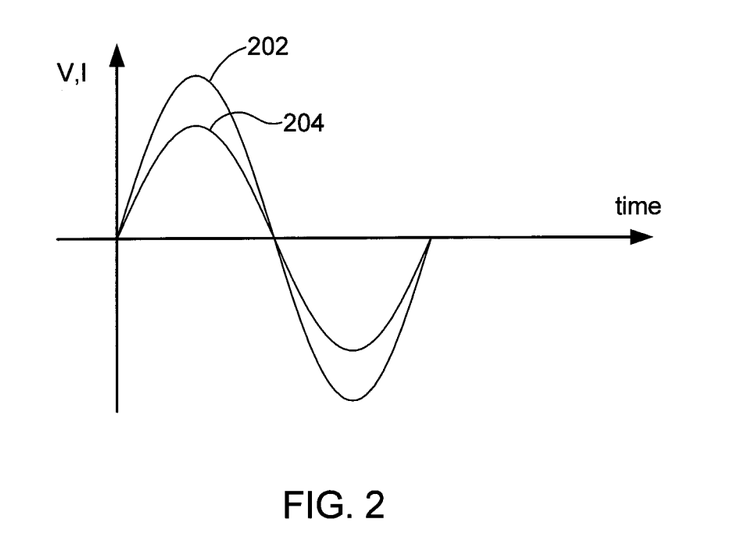
FIG. 2 shows waveforms of voltage across and current through a discharge resistor of the EMI filter circuit of FIG. 1.

FIG. 1 shows a schematic diagram of a conventional EMI filter circuit. In the example of FIG. 1, the capacitor 104 is connected in parallel with an AC source 102, a discharge resistor 106, and input of an AC-DC power supply 108. FIG. 2 shows the voltage across the resistor 106 and the current through the resistor 106 as a function of time. The voltage across the resistor 106 is simply the sinusoidal AC voltage of the AC source 102 (waveform 202), and the current at any point in time is the voltage divided by the resistance of the resistor 106 (waveform 204). The power loss in resistor 106 is the integration of the instantaneous power loss (voltage times current) divided by the period. This constant power loss may be unacceptable in energy efficient applications.

SUMMARY

In one embodiment, a discharge circuit for an EMI filter capacitor includes normally-ON transistors. The normally-ON transistors may be controlled to limit current through them when an AC source is coupled across the discharge circuit. When the AC source is disconnected from the discharge circuit, the normally-ON transistors turn ON to allow current flow through them. The current flow allows the EMI filter capacitor to be discharged by a discharge resistor.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 3:
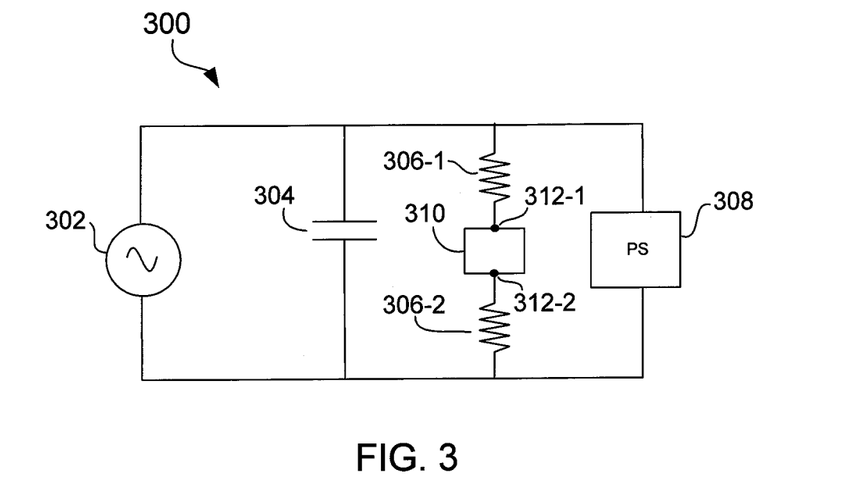
FIG. 3 shows an improved EMI filter circuit in accordance with an embodiment of the present invention.

Referring now to FIG. 3, there is shown an improved EMI filter circuit 300 in accordance with an embodiment of the present invention. In the example of FIG. 3, an EMI filter capacitor 304 is coupled in parallel with an AC source 302 and the inputs of an AC-DC power supply 308. The electrical plug of the power supply 308 is inserted into the receptacle of the AC source 302. The capacitor 304 is discharged by a series combination of discharge resistors 306 (i.e., 306-1, 306-2) and a discharge circuit 310. In one embodiment, the discharge circuit 310 is in integrated circuit (IC) form having terminals 312 (i.e., 312-1, 312-2) for receiving AC input from the AC source 302. The discharge resistors 306 are external to the integrated circuit package of the discharge circuit 310.

Discharge resistors 306 are depicted as two separate resistors in FIG. 3, but may also be a single resistor as in FIG. 1. The discharge resistor is preferably divided into two resistors, with each discharge resistor being coupled to opposing terminals of the discharge circuit 310 as in FIG. 3, to provide added fault protection in the event that one resistor becomes shorted.

Figure 4:
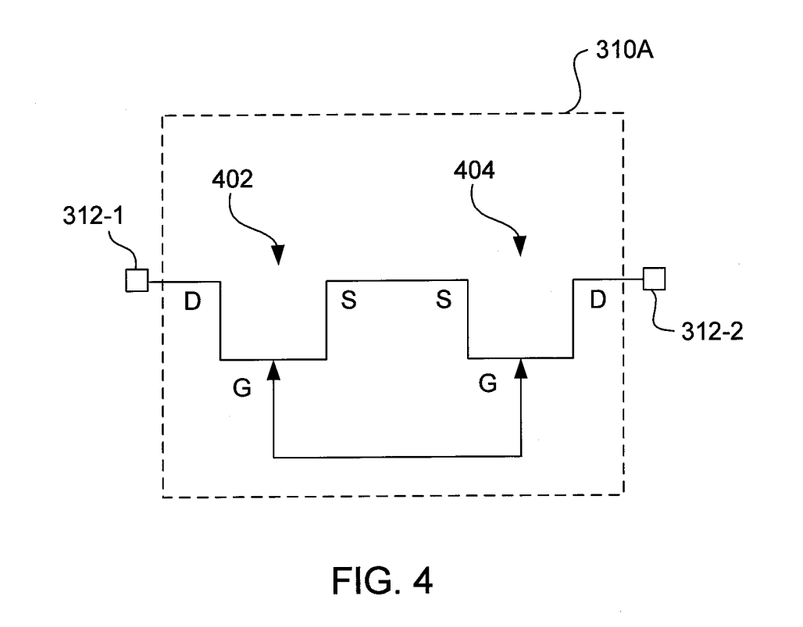
FIG. 4 shows a schematic diagram of a discharge circuit in accordance with an embodiment of the present invention.

FIG. 4 shows a schematic diagram of a discharge circuit 310A in accordance with an embodiment of the present invention. The discharge circuit 310A is a particular embodiment of the discharge circuit 310 of FIG. 3. In the example of FIG. 4, the terminals 312-1 and 312-2 (see also FIG. 3) are coupled through a series combination of a transistor 402 and a transistor 404. The transistors 402 and 404 are normally-ON devices, i.e. each will support current flow from its drain terminal (D) to its source terminal (S) when its gate terminal (G) is coupled to its source terminal. The transistors 402 and 404 also have saturating current-voltage characteristics, i.e. the drain current is proportional to the drain-source voltage up to a certain drain-source voltage level (the pinch-off voltage, VP), while the drain current is substantially constant for drain-source voltages above the pinch-off voltage. In one embodiment, the transistors 402 and 404 are junction field effect transistors (JFETs). In another embodiment, they are depletion-mode MOSFETs. As shown in FIG. 4, the transistors 402 and 404 are configured such that their source terminals and their gate terminals are coupled together.

Figure 5:
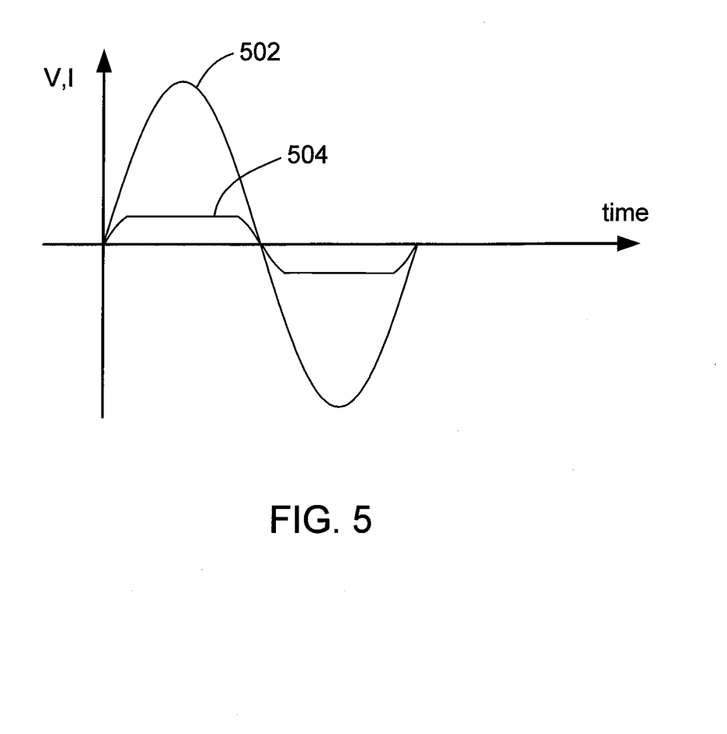
FIG. 5 shows waveforms of voltage across and current through the discharge circuit of FIG. 4.

FIG. 5 shows the voltage across the discharge circuit 310A (waveform 502) and the current through the discharge circuit 310A (waveform 504) as a function of time. The voltage is simply the sinusoidal AC input voltage from the AC source 302. Consider the first half of the sine wave, during which the voltage at the terminal 312-1 is higher than the voltage at the terminal 312-2. When the voltage difference between the terminal 312-1 and the terminal 312-2 is less than the pinch-off voltage of the transistor 402, the current through the discharge circuit 310A increases with increasing input voltage. When the voltage difference between the terminal 312-1 and the terminal 312-2 exceeds the pinch-off voltage of the transistor 402, the current through the discharge circuit 310A is substantially constant as limited by the saturating characteristics of the transistor 402. Therefore, the power loss in the discharge circuit 310A is determined substantially by the saturation current of the transistor 402, and this power loss can be much less than the power loss in the discharge resistor of conventional designs (e.g., FIG. 1). However, the saturation current must be high enough to provide the fast discharge requirement when the AC source is disconnected from the discharge circuit, so there is a trade-off between discharge rate and on-state power dissipation. The transistor 404 operates in the same manner as the transistor 402 for the second half of the sine wave.

When the AC source 302 is removed, the transistors 402 and 404, which are in their normally ON state, allow current to flow through them and the discharge resistors 306, thereby discharging the EMI filter capacitor 304. The current flow, and thus the discharge rate of the EMI filter capacitor 304, is dictated by the saturation current of the transistors 402 and 404.

Figure 6:
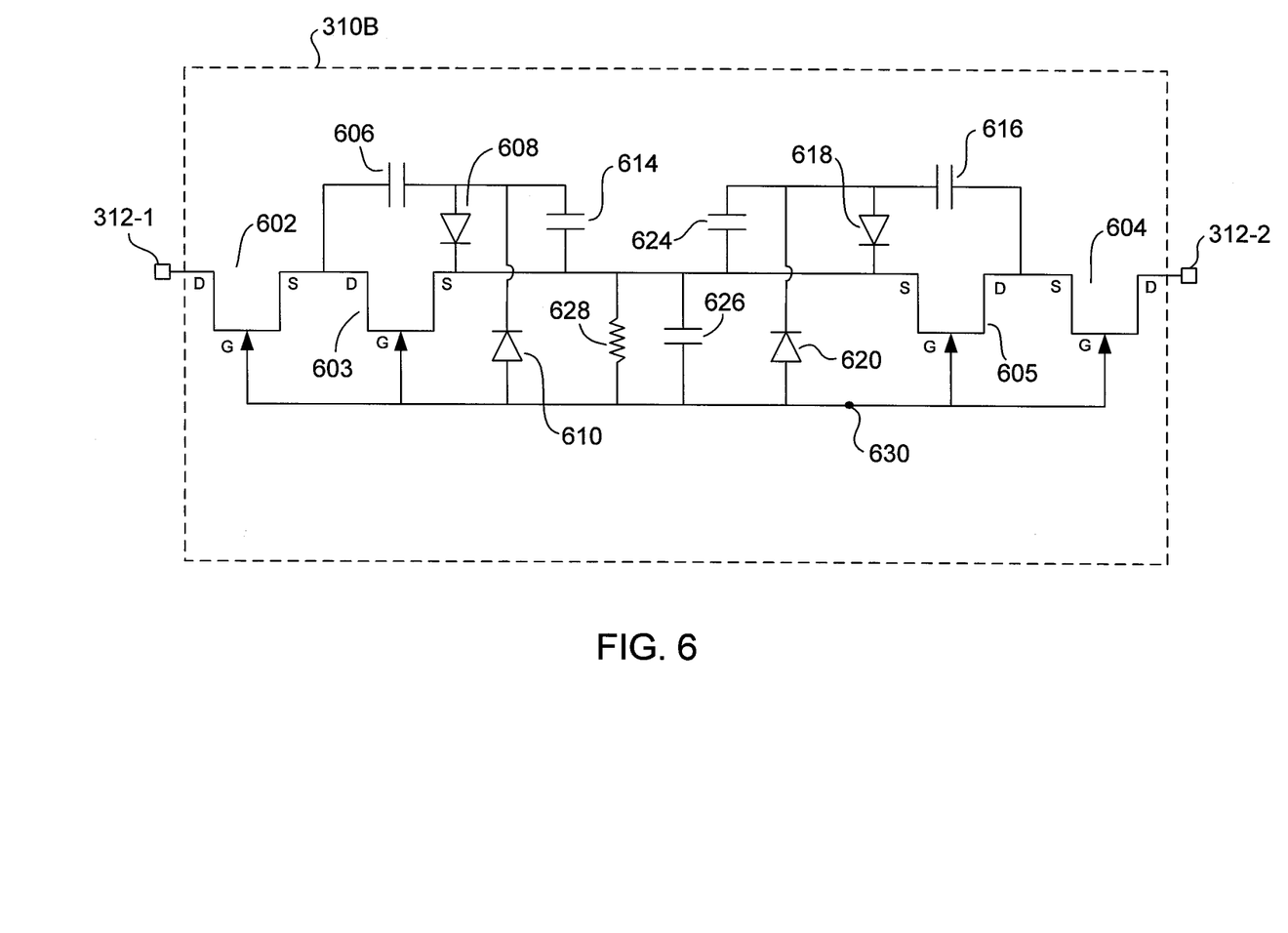
FIG. 6 shows a schematic diagram of a discharge circuit in accordance with another embodiment of the present invention.

FIG. 6 shows a schematic diagram of a discharge circuit 310B in accordance with an embodiment of the present invention. The discharge circuit 310B is a particular embodiment of the discharge circuit 310 of FIG. 3. The discharge circuit 310B improves on the aforementioned trade-off by actively controlling the gates of the normally-ON transistors such that they conduct less current when the AC source is present for reduced power dissipation, and conduct more current when the AC source is removed for faster discharge.

In the discharge circuit 310B, the terminals 312-1 and 312-2 (see also FIG. 3) are coupled through transistors 602, 603, 604, and 605. The transistors 602, 603, 604, and 605 are normally-ON devices with saturating characteristics, as previously described with reference to FIG. 4. In one embodiment, the transistor 602 can support high input voltages (e.g. 600-1200V) and has a relatively high pinch-off voltage (e.g. 40-80V) while the transistor 603 only has to support the pinch-off voltage of the transistor 602 and has a lower pinch-off voltage (e.g. 2-20V). In another embodiment, the transistors 602 and 603 can be combined into one transistor that can support high voltages (e.g. 600-1200V) and having low pinch-off voltage (e.g. 2-20V). One motivation for using separated transistors is the ability to couple other components to the intermediate node (source of transistor 602) such that they can be protected from the high input voltage. In the example of FIG. 6, the capacitor 606 can advantageously have a lower voltage rating because it is protected by the transistor 602 from the high input voltage on the terminal 312-1.

In normal operation, sinusoidal AC input voltage from the AC source is present across terminals 312-1 and 312-2. During the first half of the sinusoidal waveform of the AC input voltage, a voltage on the terminal 312-1 is higher than a voltage on the terminal 312-2. In this region of operation, the capacitor 606 works in conjunction with the diode 608 and the diode 610 to provide a voltage at a common node 630, which is more negative than the voltage on the terminal 312-1. This negative voltage is temporarily stored by the capacitor 626 and applied across the gate and source terminals of the transistor 603. When the magnitude of this voltage is sufficiently high, the normally-ON transistor 603 is turned OFF, blocking current flow from terminal 312-1 to terminal 312-2. Equivalent action by the capacitor 616, the diode 618, and the diode 620 turn OFF the transistor 605 during the second half of the sinusoidal waveform of the input AC voltage, blocking current flow from the terminal 312-2 to the terminal 312-1. Thus, when the AC source is present, the discharge circuit 310B prevents current flow, thereby greatly reducing the power loss in the discharge circuit 310B.

Figure 7:
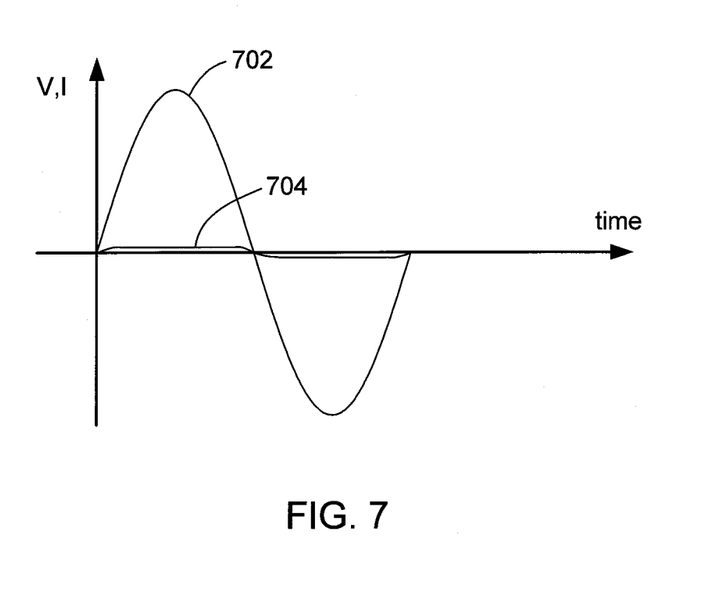
FIG. 7 shows waveforms of voltage across and current through the discharge circuit of FIG. 6.

FIG. 7 shows the voltage across the discharge circuit 310B (waveform 702) and the current through discharge circuit 310B (waveform 704) as a function of time. The voltage is simply the sinusoidal AC input voltage from the AC source 302 (see FIG. 3). The current level is very low because the transistor 603 blocks current flow during the first half of the cycle and the transistor 605 blocks current flow during the second half of the cycle. Thus, the power loss in the discharge circuit 310B is much less than the power loss in the discharge resistor of conventional designs (e.g., FIG. 1) and the power loss in the discharge circuit 310A of FIG. 4.

When the AC source is removed, the capacitor 626 is discharged by the resistor 628. When the magnitude of the gate-source voltage of the transistor 603 and the transistor 605 is sufficiently low, the transistors resume their normally-ON conduction. This provides a path for current to flow from the terminal 312-1 to the terminal 312-2. The current path allows the EMI filter capacitor 304 to be discharged by the discharge resistor 306.

Figure 8:
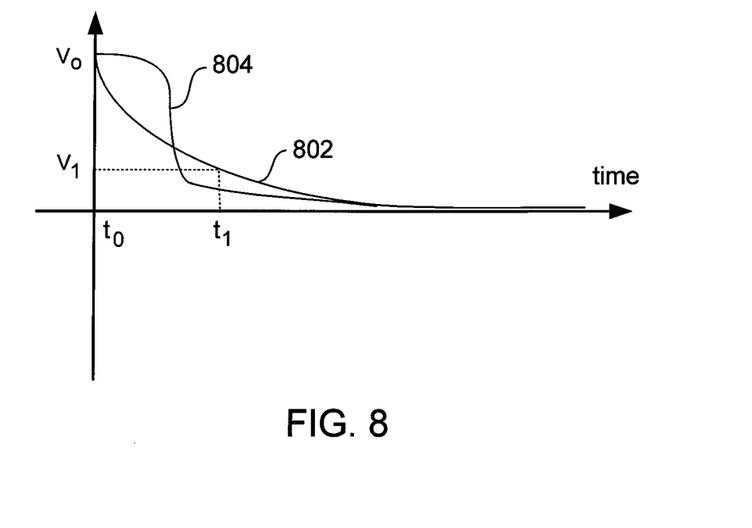
FIG. 8 shows waveforms of voltage on an EMI filter capacitor with and without an improved discharge circuit.

FIG. 8 shows the voltage on the EMI filter capacitor 304 of FIG. 3 as a function of time for the conventional EMI filter circuit of FIG. 1 (waveform 802) and for an EMI filter circuit 300 of FIG. 3 with a discharge circuit 310B of FIG. 6 (waveform 804). After the AC source is removed at time t0, the waveform 802 shows a simple resistor-capacitor (RC) discharge characteristic. A safety specification may typically require that the voltage decrease from its initial magnitude V0 to some acceptable level V1 within a given period of time t1. In waveform 804, the voltage remains near V0 for some delay time, determined by the initial voltage on the capacitor 626, the discharging of the capacitor 626 through resistor 628, and the pinch-off voltage of the transistors 603 and 605. After the transistors 603 and 605 are both conducting current, the voltage drops quickly as the EMI filter capacitor 304 is discharged through the series combination of the transistors 602, 603, 604, and 605. The rate of this discharge may be limited by the current capability (e.g. saturation current) of these transistors and/or the value of the discharge resistors 306. These components are preferably selected to insure that the voltage drops below V1 within the allotted time t1.

A relatively large discharge resistor may attenuate the AC input voltage such that the discharge circuit 310B may have difficulty starting up. One way to address this situation is to provide an additional input terminal for directly coupling the AC input voltage to the discharge circuit. An example of this embodiment is now described beginning with FIG. 9.

Figure 9:
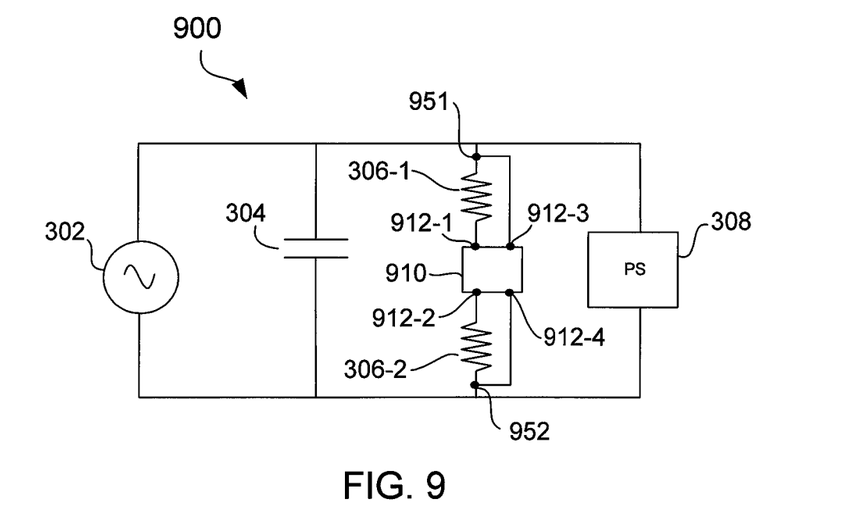
FIG. 9 shows an improved EMI filter circuit in accordance with another embodiment of the present invention.

FIG. 9 shows an improved EMI filter circuit 900 in accordance with an embodiment of the present invention. In the example of FIG. 9, the AC source 302, the EMI filter 304, the discharge resistors 306, and the AC-DC power supply 308 are as previously described with reference to FIG. 3.

The EMI filter circuit 900 further includes a discharge circuit 910. In one embodiment, the discharge circuit 910 is in integrated circuit form having terminals 912 (i.e., 912-1, 912-2, 912-3, and 912-4) for receiving AC input from the AC source 302. The terminals 912 may constitute pins of the integrated circuit package. The terminals 912-1 and 912-2 receive AC input voltage from the AC source through the discharge resistors 306. As will be more apparent below, the terminals 912-3 and 912-4 directly couple the AC input voltage to the capacitors 606 and 616, bypassing the discharge resistors 306. One end of the discharge resistor 306-1 is coupled to the terminal 912-1, and the other end of the discharge resistor 306-1 is coupled to the terminal 912-3 by way of a node 951. Similarly, one end of the discharge resistor 306-2 is coupled to the terminal 912-2, and the other end of the discharge resistor 306-2 is coupled to the terminal 912-4 by way of a node 952. The AC source 302 is across the discharge circuit 910, and is directly coupled to the nodes 951 and 952.

Figure 10:
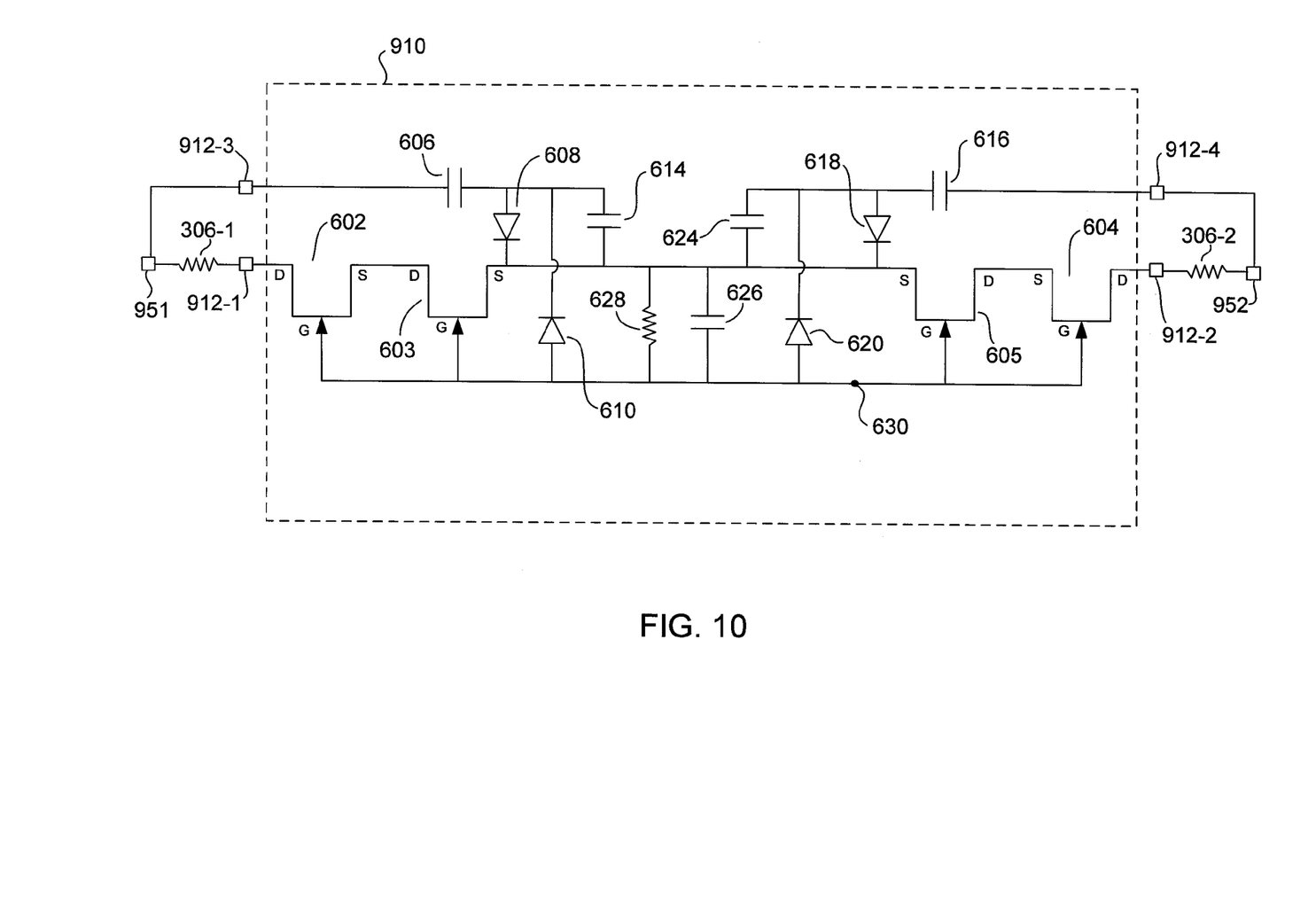
FIG. 10 shows a schematic diagram of a discharge circuit in accordance with another embodiment of the present invention.

FIG. 10 shows a schematic diagram of the discharge circuit 910 in accordance with an embodiment of the present invention. The discharge circuit 910 is the same as the discharge circuit 310B of FIG. 6, except for the addition of the terminals 912-3 and 912-4 for accepting AC input directly without going through the resistors 306. In the example of FIG. 10, the capacitor 606 receives AC input voltage from the node 951 by way of the terminal 912-3. This allows the AC input voltage to be coupled directly to the capacitor 606 without getting attenuated by the discharge resistor 306-1. Similarly and for the same reason, the capacitor 616 receives AC input voltage directly from the node 952 by way of the terminal 912-4. The discharge circuit 910 otherwise operates in the same manner as the discharge circuit 310B of FIG. 6.

In the discharge circuit 910, the capacitor 606 is directly coupled to the AC source 302, and thus requires a higher voltage rating. As a trade-off, the discharge circuit 910 advantageously allows for more stable startup compared to the discharge circuit 310B. In discharge circuit 910, there is no connection to the intermediate node between the source of transistor 602 and the drain of transistor 603. Thus, in the discharge circuit 910, it may be advantageous to combine transistors 602 and 603 into a single, normally-ON transistor that has high blocking voltage and relatively low pinch-off voltage. The same applies to the transistors 604 and 605 in the discharge circuit 910.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A discharge circuit for a capacitor, the discharge circuit comprising:
   a first normally-ON transistor; and
   a second normally-ON transistor, a source of the first normally-ON transistor being coupled to a source of the second normally-ON transistor, a gate of the first normally-ON transistor being coupled to a gate of the second normally-ON transistor, the first and second normally-ON transistors being configured to allow current flow through a drain of the first normally-ON transistor and a drain of the second normally-ON transistor when an AC source coupled across the discharge circuit is disconnected from the discharge circuit, the current flow allowing the capacitor of an AC-DC power supply to be discharged.

2. The discharge circuit of claim 1 further comprising:
   a first discharge resistor coupled to the drain of the first normally ON transistor and a second discharge resistor coupled to the drain of the second normally-ON transistor.

3. The discharge circuit of claim 2 wherein the AC source is coupled in parallel with a series combination of the first discharge resistor, the second discharge resistor, and the discharge circuit.

4. The discharge circuit of claim 1 wherein the first and second normally-ON transistors comprise JFETs.

5. The discharge circuit of claim 1 wherein the first and second normally-ON transistors comprise depletion-mode MOSFETs.

6. A method of discharging an EMI filter capacitor in an AC-DC power supply, the method comprising:
   turning-ON a first normally-ON transistor and a second normally-ON transistor to allow current to flow through the first and second normally-ON transistors when an AC source coupled across a discharge circuit is disconnected; and
   discharging an EMI filter capacitor of an AC-DC power supply when the current flows through the first and second normally-ON transistors in response to the disconnection of the AC source from the discharge circuit.

7. The method of claim 6 wherein a first discharge resistor is coupled between the first normally ON transistor and one end of the AC source and a second discharge resistor is coupled between the second normally ON transistor and another end of the AC source.

8. The method of claim 6 wherein the first and second normally-ON transistors comprise JFETs.

9. The method of claim 6 wherein the first and second normally-ON transistors comprise depletion-mode MOSFETs.

10. A discharge circuit for an EMI filter capacitor of an AC-DC power supply, the discharge circuit comprising:
    a first capacitor;
    a first normally-ON transistor; and
    a second normally-ON transistor, a source of the first normally-ON transistor being coupled to a drain of the second normally-ON transistor, a gate of the first normally-ON transistor being coupled to a gate of the second normally-ON transistor, the second normally-ON transistor being configured to be turned OFF by charge on the first capacitor when an AC source is coupled across the discharge circuit, the first and second normally-ON transistors being configured to allow a current to flow through the first and second normally-ON transistors when the AC source is disconnected from the discharge circuit, the current allowing the EMI filter capacitor to be discharged.

11. The discharge circuit of claim 10 further comprising:
    a second capacitor configured to develop a voltage on a common node of the discharge circuit to charge the first capacitor when the AC source is coupled across the discharge circuit.

12. The discharge circuit of claim 11 wherein the second capacitor is coupled to the source of the first normally-ON transistor and to the drain of the second normally-ON transistor.

13. The discharge circuit of claim 11 wherein the second capacitor is coupled directly to the AC source.

14. The discharge circuit of claim 11 wherein the second capacitor is coupled to the AC source through a discharge resistor.

15. The discharge circuit of claim 10 further comprising:
a resistor coupled across the first capacitor, the resistor being configured to discharge the first capacitor when the AC source is disconnected from the discharge circuit.

16. The discharge circuit of claim 10 further comprising a first discharge resistor coupled between a drain of the first normally ON transistor and the AC source.

17. The discharge circuit of claim 16 further comprising a second discharge resistor, the first discharge resistor being coupled to one end of the AC source and the second discharge resistor being coupled to another end of the AC source.

18. The discharge circuit of claim 10 further comprising:
a third normally-ON transistor; and
a fourth normally-ON transistor, a source of the third normally-ON transistor being coupled to a drain of the fourth normally-ON transistor, a gate of the third normally-ON transistor being coupled to a gate of the fourth normally-ON transistor, the fourth normally-ON transistor being configured to be turned OFF by charge on the first capacitor when the AC source is coupled across the discharge circuit, the third and fourth normally-ON transistors being configured to allow current flow through the third and fourth normally-ON transistors when the AC source is disconnected from the discharge circuit, the current flow through the third and fourth normally-ON transistors when the AC source is disconnected from the discharge circuit allowing the EMI filter capacitor of the AC-DC power supply to be discharged.

19. The discharge circuit of claim 10 wherein the first and second normally-ON transistors comprise JFETs.

20. The discharge circuit of claim 10 wherein the first and second normally-ON transistors comprise depletion-mode MOSFETs.

\* \* \* \* \*